(12) United States Patent
Mongeau et al.

(10) Patent No.: US 12,480,471 B2
(45) Date of Patent: Nov. 25, 2025

(54) METHOD FOR REDUCING NOISE FROM WIND TURBINE GEARBOX VIBRATIONS

(71) Applicant: VESTAS WIND SYSTEMS A/S, Aarhus N (DK)

(72) Inventors: Peter Mongeau, Center Conway, NH (US); Kent Tange, Ry (DK); Nalliboyana Dharmaraju, Dortmund (DE)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/723,321

(22) PCT Filed: Dec. 21, 2022

(86) PCT No.: PCT/DK2022/050301
§ 371 (c)(1),
(2) Date: Jun. 21, 2024

(87) PCT Pub. No.: WO2023/117019
PCT Pub. Date: Jun. 29, 2023

(65) Prior Publication Data
US 2025/0154931 A1    May 15, 2025

Related U.S. Application Data

(60) Provisional application No. 63/337,756, filed on May 3, 2022, provisional application No. 63/292,327, filed on Dec. 21, 2021.

(30) Foreign Application Priority Data

| Jan. 10, 2022 | (DK) | ............................... PA202200015 |
| May 3, 2022 | (DK) | ............................... PA202270232 |
| Jun. 2, 2022 | (DK) | ............................... PA202270296 |

(51) Int. Cl.
*F03D 7/02* (2006.01)
*F03D 15/00* (2016.01)
(Continued)

(52) U.S. Cl.
CPC ......... *F03D 7/0298* (2023.08); *F03D 7/0296* (2013.01); *F03D 15/00* (2016.05);
(Continued)

(58) Field of Classification Search
CPC ...... F03D 7/0298; F03D 7/0296; F03D 15/00; F03D 17/0033; F03D 17/017; H02P 9/02;
(Continued)

(56) References Cited

U.S. PATENT DOCUMENTS

| 2006/0066111 | A1 | 3/2006 | Suryanarayanan et al. |
| 2009/0149999 | A1* | 6/2009 | Schramm ............ F16H 57/0006 700/280 |
| 2019/0081583 | A1 | 3/2019 | Xie |

FOREIGN PATENT DOCUMENTS

| EP | 1944667 A1 | 7/2008 |
| EP | 2071213 A1 | 6/2009 |

(Continued)

OTHER PUBLICATIONS

Danish Patent and Trademark Office, 1st Technical Examination including The Search Report and Opinion for Application PA 2022 00015 dated Aug. 10, 2022.
(Continued)

*Primary Examiner* — Sean Gugger
(74) *Attorney, Agent, or Firm* — Patterson + Sheridan, LLP; Gero G. McClellan

(57) ABSTRACT

A method for controlling operation of a generator for a wind turbine is disclosed. At least one amplitude of a harmonic in the gearbox vibrations is determined. A torque modulating signal for the generator is generated. A phase angle and the (Continued)

amplitude are adjusted during operation of the generator, until a minimum in amplitude of a resultant vibration is reached, thereby obtaining an adjusted torque modulating signal. The adjusted torque modulating signal is injected into the generator, resulting in the resultant vibration of vibrations of the gearbox and vibrations of the generator, corresponding to the harmonic in the gearbox vibrations, being reduced.

20 Claims, 8 Drawing Sheets

(51) Int. Cl.
  *F03D 17/00* (2016.01)
  *H02P 9/02* (2006.01)
(52) U.S. Cl.
  CPC ......... *F03D 17/017* (2023.08); *F03D 17/033* (2023.08); *H02P 9/02* (2013.01); *F05B 2260/96* (2013.01); *F05B 2270/327* (2013.01); *F05B 2270/334* (2013.01)

(58) Field of Classification Search
  CPC ............ F05B 2260/96; F05B 2270/327; F05B 2270/334
  See application file for complete search history.

(56) References Cited

FOREIGN PATENT DOCUMENTS

| | | |
|---|---|---|
| EP | 2754889 A1 | 7/2014 |
| EP | 3297156 A1 | 3/2018 |
| EP | 3614556 A1 | 2/2020 |
| WO | 9830813 A1 | 7/1998 |

OTHER PUBLICATIONS

PCT International Search Report and Written Opinion of The International Searching Authority for Application PCT/ DK2022/ 050301 dated May 9, 2023 (Sep. 5, 2023).

* cited by examiner

| Tm Table | $\omega_1$ | $\omega_2$ | $\omega_3$ | $\omega_4$ | ... | ... | ... | $\omega_n$ |
|---|---|---|---|---|---|---|---|---|
| T1 | Tm1,θ11 | Tm12,θ12 | Tm13,θ13 | Tm14,θ14 | | | | Tm1n,θ1n |
| T2 | Tm21,θ21 | Tm22,θ22 | Tm23,θ23 | Tm24,θ24 | | | | Tm2n,θ2n |
| T3 | Tm31,θ31 | Tm32,θ32 | Tm33,θ33 | Tm34,θ34 | | | | Tm3n,θ31 |
| . | | | . | . | | | | . |
| . | | | | | | | | |
| . | | | | | | | | |
| Tn | Tmn,θ1 | Tmn2,θn2 | Tmn31,θn3 | Tmn4,θn4 | | | | Tmnn,θnn |

WTG torque (rows) × WTG speed (columns)

Fig. 8

METHOD FOR REDUCING NOISE FROM WIND TURBINE GEARBOX VIBRATIONS

FIELD OF THE INVENTION

The present invention relates to a method for controlling operation of a generator of a wind turbine in a manner which reduces noise originating from gear tooth meshing of a gearbox of the wind turbine.

BACKGROUND OF THE INVENTION

When operating a wind turbine, various movable parts of the wind turbine generate structure-borne vibrations and associated air-borne noise, which may be amplified by various other structures of the wind turbine, such as tower, wind turbine blades, etc. This is sometimes referred to as tonality. This may result in air-borne noise levels in the vicinity of the wind turbine which annoy neighbours or disturb animal life, and the noise may even approach or exceed allowable noise limits. It is therefore desirable to reduce such noise.

One source of wind turbine noise is vibrations originating from operation of the generator. Another source is vibrations originating from the drive train, e.g., from gear tooth meshing in the gearbox. In combination, vibrations originating from the generator and vibrations originating from the drive train constitute vibrations of the power train of the wind turbine, and thereby noise of the wind turbine as a whole.

EP 2 485 388 B1 discloses a method for controlling the operation of an electromechanical transducer, such as an electric generator for a wind turbine. The method comprises determining a harmonic control signal being indicative for a harmonic operational behaviour of the electromechanical transducer. The determining of the harmonic control signal comprises observing at least one value of operational parameters of the electromechanical transducer, and deriving from a database the harmonic control signal as a function of the observed values of the operational parameters of the electromechanical transducer. A modified drive signal is generated based on the determined harmonic control signal, and the generated modified drive signal is supplied to the electromagnetic coils of a stator of the electromechanical transducer.

DESCRIPTION OF THE INVENTION

It is an object of embodiments of the invention to provide a method for controlling operation of a generator for a wind turbine in a manner which reduces noise originating from operation of a gearbox of the wind turbine.

It is a further object of embodiments of the invention to provide a method for controlling operation of a generator for a wind turbine in a manner which reduces noise originating from gear teeth of a gearbox of the wind turbine.

According to a first aspect the invention provides a method for controlling operation of a generator for a wind turbine, the method comprising the steps of:

- obtaining a measure for a rotational speed of the generator,
- obtaining a measure for a shaft angle of the generator
- obtaining a measure for vibrations originating from gear tooth meshing of a gearbox of the wind turbine, at the rotational speed of the generator,
- determining at least one amplitude of a harmonic in the gearbox vibrations,
- generating a torque modulating signal for the generator by:
  - selecting an initial gear tooth phase angle and an initial amplitude, based on the rotational speed of the generator, on initial characteristics of the wind turbine, and on the at least one amplitude of the harmonic in the gearbox vibrations,
  - deriving a gear tooth angle estimator from the generator shaft angle position and the initial gear tooth phase angle multiplied by a gearbox ratio of a gearbox stage of the harmonic in the gearbox vibrations,
  - generating an initial torque modulating signal for the generator specifying the initial phase angle and the initial amplitude,
  - injecting the initial torque modulating signal into the generator and operating the generator based on the initial torque modulating signal, while monitoring a resultant vibration of vibrations originating from the gearbox and vibrations originating from the generator, corresponding to the harmonic in the gearbox vibrations, and
  - adjusting the phase angle of the torque modulating signal with respect to the gear tooth angle estimator and the amplitude of the torque modulating signal to fit with an actual position of the gearbox as well as with an actual position of the generator, based on the monitored resultant vibration, until a minimum in amplitude of the resultant vibration is reached, thereby obtaining an adjusted torque modulating signal, and
- injecting the adjusted torque modulating signal into the generator, thereby obtaining operation of the generator resulting in the resultant vibration of vibrations of the gearbox and vibrations of the generator, corresponding to the harmonic in the gearbox vibrations, being minimised.

Thus, according to the first aspect, the invention provides a method for controlling operation of a generator for a wind turbine. In the present context the term 'generator' should be interpreted to mean an electromechanical transducer which transforms mechanical movements of the wind turbine into electrical energy.

The measure for the vibrations originating from gear tooth meshing of a gearbox, can in an embodiment just be the amplitudes.

In the method according to the first aspect of the invention, a measure for a rotational speed of the generator is initially obtained. The rotational speed may be a rotational speed of a low-speed shaft or a high-speed shaft. In any event, the obtained rotational speed provides information regarding how rotating parts of the drive train rotate, including rotations of meshing gears of the gearbox. The rotational speed may, e.g., be measured, or it may be provided by a controller for the generator.

Next, a measure for vibrations originating from gear tooth meshing of the gearbox of the wind turbine, at some predetermined multiplier times the rotational speed of the generator, is obtained. It should be recognized that this angle multiplier is not necessarily an integer and could be any rational number as determined by the gearbox construction. The vibrations may be measured directly at the gearbox, e.g., by means of a suitable vibration sensor, such as an accelerometer, mounted on the gearbox. As an alternative, the vibrations may be measured in an indirect manner, e.g., by measuring vibrations of amplifying parts of the wind turbine, such as the tower and/or the wind turbine blades, induced by the vibrations of the gearbox, and/or by measuring a noise level at a specified distance from the wind turbine.

Next, at least one amplitude of a harmonic in the gearbox vibrations is determined. In the present context the term 'harmonic' should be interpreted to mean vibrations at a frequency which is a fundamental frequency, such as an eigenfrequency or a resonance frequency, of the gearbox system, or which is a positive integer multiple of such a fundamental frequency.

The harmonics of a gearbox are closely related to the design of the gearbox, to the design of various gear stages and the number of gear teeth on the meshing gears and are dependent on the rotational speed of the gear system. For instance, the vibrations originating from gear tooth meshing define a fundamental frequency which is a non-integer multiple of the rotational speed of the input shaft or the output shaft of the gearbox, and the non-integer ratio depends on the internal components of the gearbox in accordance with standards practice. For a specific harmonic in the gearbox vibration, there is a gearbox ratio of the specific gearbox stage from where the harmonic derives. A specific gearbox has number of predetermined gearbox ratios that can be used, when determining from which stage of the gearbox, and thus gear tooth the harmonic comes from.

The selecting of the right gearbox ratio can be arranged in a look up table, where generator speed and different gearbox ratios are stored together with gear tooth meshing. As the number of ratios are limited an initial phase may be used where the harmonics are linked to the gear tooth meshing.

The amplitude of the harmonic in the gearbox vibrations represents the level of the noise originating from gear tooth meshing of the gearbox.

Next, a torque modulating signal for the generator is generated. In the present context the term 'torque modulating signal' should be interpreted to mean a control signal which defines an AC torque sinus which can be added on top of a DC power producing torque of the generator. Accordingly, a torque modulating signal being applied to the generator modulates the torque output of the generator.

The torque modulating signal is generated in the following manner. An initial phase angle and an initial amplitude are selected, based on an initial observed reference angle of the generator shaft, the continuous tracking of the generator shaft angle, the rotational speed of the generator, on initial characteristics of the wind turbine, and on the at least one amplitude of the harmonic in the gearbox vibrations. The initial characteristics of the wind turbine may, e.g., include design characteristics of the gearbox, such as gear ratio, number of teeth on the gear wheels, etc.

Accordingly, the initial phase angle and the initial amplitude are selected in a manner which takes the rotational speed of the generator and characteristics of the wind turbine which are related to the gearbox design into account. As described above, these two kinds of information can be used for deriving information related to gear tooth meshing, such as a frequency of vibrations originating from gear tooth meshing. Furthermore, the at least one amplitude of the harmonic in the gear box vibrations is taken into account when selecting the initial phase angle and the initial amplitude of the torque modulation sinus. Thus, the initial phase angle and the initial amplitude are selected in a manner which at least to some extend is expected to match the vibrations originating from gear tooth meshing of the gearbox.

Next, an initial torque modulating signal for the generator is generated, specifying the initial phase angle and the initial amplitude. The initial torque modulating signal is injected into the generator, and the generator is operated based on the initial torque modulating signal. Thus, the torque of the generator is modulated in a manner which is specified by the initial phase angle of the gearbox tooth angle estimator and the initial amplitude, and which thereby, at least to some extent, reflects or matches the vibrations originating from gear tooth meshing of the gearbox.

While operating the generator based on the initial torque modulating signal, a resultant vibration of vibrations originating from the gearbox and vibrations originating from the generator, corresponding to the harmonic in the gearbox vibrations, is monitored. In the present context the term 'resultant vibration' should be interpreted to mean the total vibrations of the power train, i.e., the combination of vibrations originating from the gearbox and the generator, at a frequency corresponding to the harmonic in the gearbox vibrations. The resultant vibration may, thus, be regarded as a superposition of the vibrations originating from the gearbox and the vibrations originating from the generator, at a frequency corresponding to the harmonic in the gearbox vibrations.

Next, the phase angle and the amplitude of the torque modulating signal are adjusted to fit with an actual position of the gearbox as well as with an actual position of the generator and based on the monitored resultant vibration. This is done by adjusting or tuning the phase angle and the amplitude, while monitoring the resultant vibration, and in such a manner that a minimum in amplitude of the resultant vibration is reached. Thus, the optimal phase angle and amplitude of the torque modulating signal are 'hunted'. This results in an adjusted torque modulating signal, specifying the adjusted phase angle and the adjusted amplitude.

It should be realized that said torque modulation signal comprises a time varying modification of the torque command that is used as in single input to the generator controller. Such variation of the torque input only affects the overall input to the generator controller and does not require or imply any modification to the internal workings of the generator controller as is well known to those knowledgeable in the field of electric machine control.

Since the resultant vibration represents the vibrations of the entire power train, the amplitude of the resultant vibration represents a noise level of the noise originating from the entire power train. Therefore, minimising the amplitude of the resultant vibration also minimises the noise generated by the power train, at the source of the noise.

As described above, the amplitude of the resultant vibration is minimised by appropriately adjusting the phase angle and the amplitude of the torque modulating signal. In other words, the torque modulating signal is 'designed' in a manner which matches the vibrations originating from gear tooth meshing of the gearbox, in the sense that the torque modulating signal causes the generator to operate in a manner which causes vibrations of the generator which to the greatest possible extent cancel out the vibrations originating from gear tooth meshing of the gearbox.

The gear tooth estimated angle is based on tracking the generator shaft angle times the appropriate gearbox tooth ratio based thereby creating an estimated gear tooth angle from an initial reference angle of the generator shaft angle For instance, the torque modulating signal may define a frequency which corresponds to the harmonic in the gearbox vibrations, an amplitude which corresponds to the amplitude of the harmonic in the gearbox vibrations, and a phase angle which ensures a match between the phase angle of the gearbox and the phase angle of the generator.

Finally, the adjusted torque modulating signal, which was generated in the manner described above, is injected into the generator. Thereby the generator is operated in a manner which results in the resultant vibration of the vibrations of the gearbox and the vibrations of the generator, corresponding to the harmonic in the gearbox vibrations, being minimised, since the vibrations originating from the generator to the greatest possible extent cancel out the vibrations originating from gear tooth meshing of the gearbox.

Thereby the total noise generated by the wind turbine is reduced.

The step of adjusting the phase angle and the amplitude of the torque modulating signal may comprise the steps of:
  adjusting the phase angle of the of the torque modulating signal to fit with an actual position of the gearbox as well as with an actual position of the generator, based on the monitored resultant vibration, until a minimum in amplitude of the resultant vibration is reached, and
  subsequently adjusting the amplitude of the torque modulating signal, based on the monitored resultant vibration, until a minimum in amplitude of the resultant vibration is reached, thereby obtaining an adjusted torque modulating signal.

According to this embodiment, the adjustment of the phase angle and the amplitude of the torque modulating signal is performed in two steps. First, the phase angle of the torque modulating signal is adjusted in order to align with the actual position of the gearbox as well as with the actual position of the generator. This is done by adjusting the phase angle until a minimum in amplitude of the resultant vibration is reached, and the corresponding phase angle is selected as the one which provides the best match between the harmonic in the gearbox vibrations and the vibrations originating from the generator.

Once the optimal or correct phase angle has been identified as described above, a similar process is performed with respect to the amplitude of the torque modulating signal, i.e., the amplitude is adjusted, while keeping the phase angle constant, until a minimum in amplitude of the resultant vibration is reached.

Once the optimal or correct amplitude has been identified, an optimisation process for the phase angle may be performed again, and so on, thereby alternatingly optimising the phase angle and the amplitude.

By performing the adjustment of the phase angle and the amplitude of the torque modulating signal in this manner, it is avoided that the optimisation of the phase angle and the optimisation of the amplitude 'interfere' with one another. Thereby a 'true minimum' for the phase angle as well as for the amplitude of the resultant vibration is reached faster and more reliably.

As an alternative, the phase angle and the amplitude of the torque modulating signal may be adjusted simultaneously and/or in a single adjustment process.

The step of selecting an initial phase angle and an initial amplitude may comprise selecting at least an amplitude from a look-up table. According to this embodiment, a look-up table may be generated, e.g., empirically and/or by means of theoretical calculations. The look-up table may specify appropriate amplitudes for the torque modulating signal for appropriate combinations of design specifics of the wind turbine, in particular, that of the gearbox, the rotational speed of the generator and the amplitude of the harmonic in the gearbox vibrations. Thereby the initial amplitude is a qualified guess on an optimal amplitude, resulting in a minimisation of the amplitude of the resultant vibration. This makes the 'hunting process' described above faster and more accurate.

Furthermore, the initial phase angle may also be selected from the look-up table. As an alternative, the initial phase angle may be selected arbitrarily, and the 'correct' phase angle may be identified by means of the 'hunting process' described above.

The method may further comprise the step of updating the look-up table, based on the adjusted phase angle and/or the adjusted amplitude of the adjusted torque modulating signal.

According to this embodiment, the look-up table is continuously adjusted and improved, based on the adjusted phase angle and/or the adjusted amplitude, and thereby based on values of the phase angle and the amplitude which result in a minimisation of the amplitude of the resultant vibration. Thereby the initial phase angle and/or the initial amplitude selected at future occasions will be more accurate. This is sometimes referred to as a feed-forward control with self-tuning.

As an alternative to selecting the initial phase angle and/or the initial amplitude from a look-up table, the initial phase angle and/or the initial amplitude may be selected in any other suitable manner, e.g., based on calculations performed in real-time or nearly real-time.

The step of obtaining a measure for vibrations originating from gear tooth meshing of the gearbox may comprise deriving a frequency of the harmonic in the gearbox vibrations, based on the rotational speed of the generator.

As described above, for a specific gearbox with a given gear ratio and a given number of teeth on the meshing gears, the frequency of a harmonic in the gearbox vibrations is intrinsically linked to the rotational speed of the rotating parts of the gearbox, and thereby also to the rotational speed of the generator. Accordingly, the frequency of the harmonic can easily be derived or calculated from the obtained measure for the rotational speed of the generator.

The initial torque modulating signal may further specify the frequency of the harmonic in the gearbox vibrations. According to this embodiment, the initial torque modulating signal specifies the initial phase angle, the initial amplitude, as well as the frequency of the harmonic in the gearbox vibrations. Thereby the initial torque modulating signal causes the generator to operate in a manner which causes vibrations of the generator at a frequency which matches the frequency of the harmonic in the gearbox vibrations, and which are therefore appropriate for cancelling out the vibrations originating from gear tooth meshing of the gearbox.

As an alternative to deriving the frequency of the harmonic in the gearbox vibrations, the initial torque modulating signal may be generated directly based on the rotational speed of the generator, without specifically deriving the frequency of the harmonic in the gearbox vibrations.

The step of obtaining a measure for vibrations originating from gear tooth meshing of the gearbox may comprise measuring vibrations of the gearbox.

According to this embodiment, the gearbox vibrations are measured directly, e.g., by means of one or more suitable sensors mounted on or connected to the gearbox. Suitable sensors include, but are not limited to, accelerometers, high fidelity strain gauges, displacement sensors, or any other suitable kind of sensor which provides a signal from which the amplitude of the harmonic in the gearbox vibrations can be derived or isolated.

Alternatively, or additionally, the measure for vibrations from gear tooth meshing of the gearbox may be obtained in an indirect manner, e.g., by measuring vibrations of large wind turbine components being affected by the vibrations of the gearbox, e.g., the tower and/or the wind turbine blades, or by measuring a noise level and its associated spectrum at a specified distance from the wind turbine.

The measured input related to the resultant vibration may originate from two or more sensors, e.g., positioned at separate positions and/or being of different types. In this case the measured input may be handled separately, in the sense that each measured input forms part of a separate processing channel for performing the 'hunting' process described above. Thus, the separate processing channels may operate in parallel, i.e., independently of each other, and based on their respective measured input. This results in two or more torque modulating signals being generated, one for each processing channel. The two or more torque modulating signals may then be added, in order to obtain a resultant torque modulating signal, which is then injected into the generator.

The respective 'hunting' processes may take place in the frequency domain, while the adding of the torque modulating signals may take place in the time domain.

The respective torque modulating signals may be multiplied by appropriate weights before they are added to each other. The respective weights may, e.g., reflect the importance, significance, reliability, etc., of the respective corresponding sensors. Accordingly, a more important or more reliable sensor may be provided with a higher weight than a sensor which is less important or considered less reliable.

The weights may be in the form of weight functions, e.g., depending on the frequency level, average torque and/or power level of the wind turbine. For instance, a first sensor may be provided with a higher weight than a second sensor for measurements within a first frequency range, average torque and/or power level, whereas the opposite may be the case within a second frequency range, average torque and/or power level. This may reflect that some of the sensors are most important or reliable within some frequency ranges, average torque and/or power levels, whereas other sensors are most important or reliable within other frequency ranges, average torque and/or power levels. Thereby, the sensor which is most important or reliable at a relevant frequency, average torque and/or power level will be given the highest weight when the resultant torque modulating signal is formed.

The step of injecting the torque modulating signal into the generator may comprise injecting the torque modulating signal into an electronic generator controller. According to this embodiment, the torque modulating signal is supplied to an electronic generator controller, i.e., to a controller which controls operation of the generator. This modulated signal is simply added to the DC quasi-static signal used for the overall generator torque command. This torque command signal is then converted to an appropriate power switching device using well-known electrical machine control methodology. This applies to generator control of an induction or a synchronous machine, but could also apply to motor control.

The method may further comprise the step of continuously adjusting the phase angle and the amplitude of the torque modulating signal in order to maintain the amplitude of the resultant vibration at a minimum.

According to this embodiment, the 'hunting process' for optimal phase angle and amplitude is continuously performed while operating the wind turbine. Thereby it is ensured that, even if something in the system drifts or changes, a minimal amplitude of the resultant vibration is maintained.

The method may further comprise the step of obtaining a measure for a shaft angle of the generator, and the step of selecting an initial phase angle may further be based on the shaft angle of the generator.

According to this embodiment, a measure for a shaft angle of the generator is obtained, e.g., by direct measurement. The shaft angle may, e.g., be a shaft angle of the low-speed shaft or the high-speed shaft. For instance, a phase angle tracking mechanism may be applied for keeping track of shaft angle over time. The initial phase angle is then selected, based on the shaft angle of the generator.

The ratio between the generator shaft angle, e.g., the high-speed shaft angle, and the gear tooth phase angle may be a ratio between two large numbers A1 and B1, i.e., a ratio A1/B1. A1 can, e.g., be in the order of 10 to 30 times larger than B1, but the ratio will often be non-integer. The pattern will repeat itself for each B1 full rotations of the generator shaft. The initial phase angle may be selected by multiplying the generator shaft angle with an approximation of this ratio. This will provide a suitable starting point for the 'hunting process'.

However, a phase offset between the generator shaft angle and the gearbox phase angle will be introduced, due to the non-integer ratio. In order to correct this, the generator shaft angle may be continuously tracked, and the phase angle of the torque modulation signal may be adjusted, using a phase-locked loop, in order to keep the torque modulation signal locked in phase with the gear tooth mesh. According to this embodiment, a phase-locked loop is synthesized without having any direct observables of the gear tooth mesh angle within the gearbox itself. Instead, the generator shaft is observed, keeping track of its angular position over many full rotations, and using that to derive a phase-locked signal which stays in a fixed offset relative to that of the actual gear tooth mesh angle. The offset may then be gradually adjusted until a minimum amplitude of the resultant vibration is reached.

The method may further comprise the steps of:
determining at least one amplitude of at least one further harmonic in the gearbox vibrations,
selecting a further initial gear tooth phase angle and an amplitude, based on the rotational speed of the generator, on characteristics of the wind turbine, and on the at least one amplitude of the at least one further harmonic in the gearbox vibrations,
deriving a gear tooth angle estimator from the generator shaft angle position and the initial gear tooth phase angle multiplied by a gearbox ratio of a gearbox stage of the at least one further harmonic in the gearbox vibrations,
generating a further torque modulating signal for the generator specifying the selected phase angle of the further torque modulating signal and the selected amplitude of the at least one further harmonic in the gearbox vibrations, and
adjusting the phase angle of the further torque modulating signal with respect to the gear tooth angle estimator and the amplitude of the torque modulating signal to fit with an actual position of the gearbox as well as with an actual position of the generator, based on the monitored resultant vibration, until a minimum in amplitude of the resultant vibration is reached, thereby obtaining an adjusted torque modulating signal,
wherein the step of injecting the adjusted torque modulating signal into the generator comprises adding the adjusted torque modulating signal and the further torque modulating signal(s), thereby obtaining a resultant torque modulating signal, and injecting the resultant torque modulating signal into the generator.

According to this embodiment, at least one further harmonic in the gearbox vibrations is made the subject of the process of reducing the noise originating from gear tooth meshing of the gearbox by injecting an appropriate torque modulating signal into the generator, in the manner described above. Thereby two or more harmonics in the gearbox vibrations can be addressed and handled simultaneously.

The harmonics are handled separately, in the sense that separate torque modulating signals are generated for each harmonic, in such a manner that the resultant vibration corresponding to the respective harmonic is minimised. The torque modulating signals generated in this manner are then added to each other, thereby obtaining a resulting torque modulating signal, which is then injected into the generator. Thus, the resulting torque modulating signal ensures that the resultant vibrations corresponding to all the handled harmonics are minimised. Furthermore, handling the harmonics separately and subsequently adding the generated torque modulating signals is an easy manner of obtaining this.

The step of selecting a phase angle and an amplitude may comprise, for each of the at least one further harmonic:
  selecting an initial gear tooth phase angle and an initial amplitude, based on the rotational speed of the generator, on initial characteristics of the wind turbine, and on the at least one amplitude of the further harmonic in the gearbox vibrations,
  deriving a gear tooth angle estimator from the generator shaft angle position and the initial gear tooth phase angle multiplied by a gearbox ratio of a gearbox stage of the harmonic in the gearbox vibrations,
  generating an initial torque modulating signal for the generator specifying the initial phase angle and the initial amplitude,
  injecting the initial torque modulating signal into the generator and operating the generator based on the initial torque modulating signal, while monitoring a resultant vibration of vibrations originating from the gearbox and vibrations originating from the generator, corresponding to the further harmonic in the gearbox vibrations, and
  adjusting the phase angle of the further torque modulating signal with respect to the gear tooth angle estimator and the amplitude of the further torque modulating signal to fit with an actual position of the gearbox as well as with an actual position of the generator, based on the monitored resultant vibration, until a minimum in amplitude of the resultant vibration is reached, thereby obtaining an adjusted torque modulating signal.

According to this embodiment, the torque modulating signals for each of the further harmonics are generated in the manner described above, i.e., by applying the previously described 'hunting process'.

The step of obtaining a measure for vibrations originating from gear tooth meshing of the gearbox may comprise obtaining measurements from at least two sensors, and each sensor may provide measurements related to a separate harmonic in the gearbox vibrations.

According to this embodiment, the harmonics are handled via two separate channels, since each of the torque modulating signals are generated based on measurements provided by a separate sensor. Thereby measurements related to one harmonic does not interfere with measurements related to any of the other harmonics. Accordingly, it can be easily ensured that a true minimum in the resultant vibrations corresponding to each harmonic is reached.

As an alternative, measurements from a given sensor may relate to two or more harmonics.

The method may further comprise the step of communicating the phase angle and the amplitude of the adjusted torque modulating signal to a monitoring system.

According to this embodiment, the torque modulating signal, which is eventually injected into the generator, or at least the phase angle and the amplitude of this torque modulating signal, is further communicated to a monitoring system, i.e., to a system which is applied for monitoring the wind turbine, and possibly one or more further wind turbines.

The monitoring system may, e.g., be applied for monitoring the condition of the wind turbine. For instance, the monitoring system may be applied for detecting any signs of approaching wear, failure, fatigue, etc., of various components or sensors of the wind turbine. Alternatively, or additionally, the monitoring system may be applied for monitoring the performance of the wind turbine.

The vibrational signature of the gearbox, in particular changes in the vibrational signature of the gearbox, may provide information regarding the condition of the wind turbine. For instance, if a component of the wind turbine is degrading, this may give rise to a change in the vibrations generated by the wind turbine, e.g., in the vibrations originating from gear tooth meshing of the gearbox. Such a change in vibrations will further cause a change in the phase angle and/or the amplitude of the torque modulating signal being injected into the generator, in order to maintain the resultant vibration at a minimum. By communicating the phase angle and the amplitude of the adjusted torque modulating signal to the monitoring system, the monitoring system is enabled to detect such a change in the vibrational signature of the gearbox, and thereby to react on it.

According to a second aspect, the invention provides a method for controlling operation of a generator for a wind turbine, the method comprising the steps of:
  obtaining a measure for a rotational speed of the generator,
  obtaining a measure for the shaft angle of the generator,
  obtaining a measure for vibrations originating from gear tooth meshing of a gearbox of the wind turbine, at the rotational speed of the generator,
  determining at least one amplitude of a harmonic in the gearbox vibrations,
  selecting an initial gear tooth phase angle and an initial amplitude, based on the rotational speed of the generator, on initial characteristics of the wind turbine, and on the at least one amplitude of the harmonic in the gearbox vibrations,
  deriving a gear tooth angle estimator from the generator shaft angle position and the initial gear tooth phase angle multiplied by a gearbox ratio of a gearbox stage of the harmonic in the gearbox vibrations,
  generating a torque modulating signal for the generator specifying the derived phase angle and the selected amplitude, and
  injecting the torque modulating signal into the generator, thereby obtaining operation of the generator resulting in a resultant vibration of vibrations of the gearbox and vibrations of the generator, corresponding to the harmonic in the gearbox vibrations, being minimised.

The method according to the second aspect of the invention is like the method according to the first aspect of the invention, and the remarks set forth above with reference to the first aspect of the invention are therefore equally applicable here.

However, in the method according to the second aspect of the invention, the selection of the phase angle and the amplitude of the torque modulating signal does not necessarily involve the 'hunting process' described above. However, the phase angle and the amplitude are still selected based on the rotational speed of the generator, on characteristics of the wind turbine, and on the at least one amplitude of the harmonic in the gearbox vibrations, and it may therefore be expected that the operation of the generator, based on the torque modulating signal, will match the gearbox vibrations, in the sense that the amplitude of the resultant vibration is minimised.

BRIEF DESCRIPTION OF THE DRAWINGS

The invention will now be described in further detail with reference to the accompanying drawings in which FIG. 8 is a table illustrating optimum values for phase angle and amplitude for a torque modulating signal at various operating points of a wind turbine.

DETAILED DESCRIPTION OF THE DRAWINGS

Figure 1:
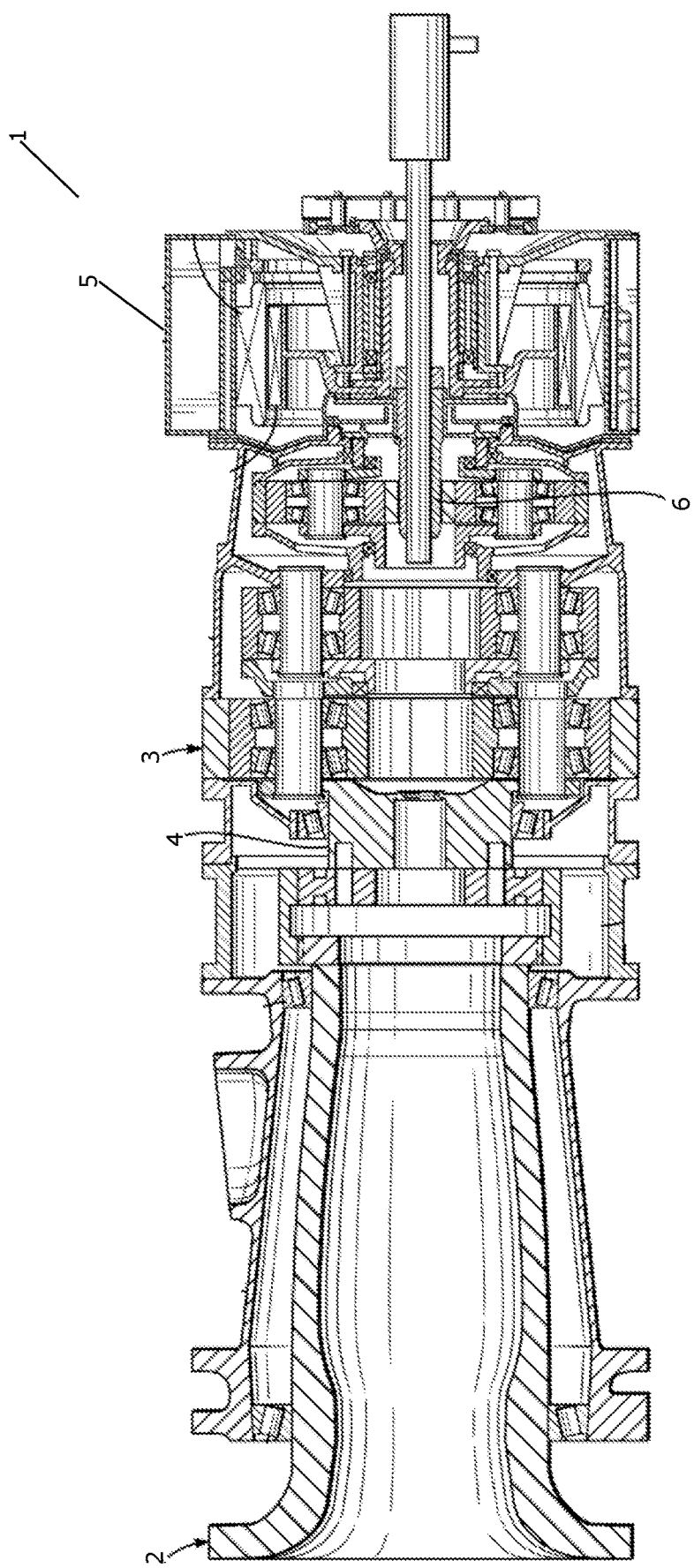
FIG. 1 is a cross sectional view of a power train of a wind turbine, being controlled in accordance with a method according to an embodiment of the invention.

FIG. 1 is a cross sectional view of a power train 1 of a wind turbine being controlled in accordance with a method according to an embodiment of the invention. The power train 1 comprises a main shaft 2 connected to a rotor (not shown) of the wind turbine, a gearbox 3 connected to the main shaft 2 via an input shaft 4, and a generator 5 connected to the gearbox 3 via an output shaft 6.

The generator 5 is controlled in such a manner that an amplitude of the total vibrations of the power train 1, in the form of a resultant vibration of vibrations originating from gear tooth meshing of the gearbox 3 and vibrations originating from the generator 5, is minimised.

This is obtained by obtaining a measure for a rotational speed of the generator 5, e.g., in the form of a rotational speed of the input shaft 4 or in the form of a rotational speed of the output shaft 6. Furthermore, vibrations originating from gear tooth meshing of the gearbox 3, at the rotational speed, are measured, and a frequency and an amplitude of at least one harmonic in the gearbox vibrations are determined.

A torque modulating signal for the generator 5 is then generated in the following manner. First, an initial phase angle based on the reference generator shaft angle multiplied by the appropriate gear tooth ratio and an initial amplitude are selected, which may be expected to match the vibrations of the gearbox 3. For instance, at least the initial amplitude may be selected from a look-up table. An initial torque modulating signal for the generator 5 is then generated, specifying the initial phase angle and the initial amplitude, and the initial torque modulating signal is injected into the generator 5.

Accordingly, the generator 5 is operated based on the initial torque modulating signal, and thereby in accordance with the initial phase angle and the initial amplitude. During this, a resultant vibration of the power train 1, corresponding to the harmonic in the gearbox vibrations, is monitored. Furthermore, the phase angle and the amplitude of the torque modulating signal are adjusted to fit an actual position of the gearbox 3 as well as an actual position of the generator 5, and based on the monitored resultant vibrations, until a minimum in amplitude of the resultant vibration is reached. Thereby an adjusted torque modulating signal for the generator 5 is obtained, which specifies the adjusted phase angle as compared to the gearbox tooth angle estimator described above and the adjusted amplitude.

The adjusted torque modulating signal is then injected into the generator 5. Thereby the generator 5 is operated in such a manner that the resultant vibration of the power train 1, corresponding to the harmonic of the gearbox vibrations, has a minimal amplitude. Thereby the noise generated by the power train 1 is also minimised.

Figure 2:
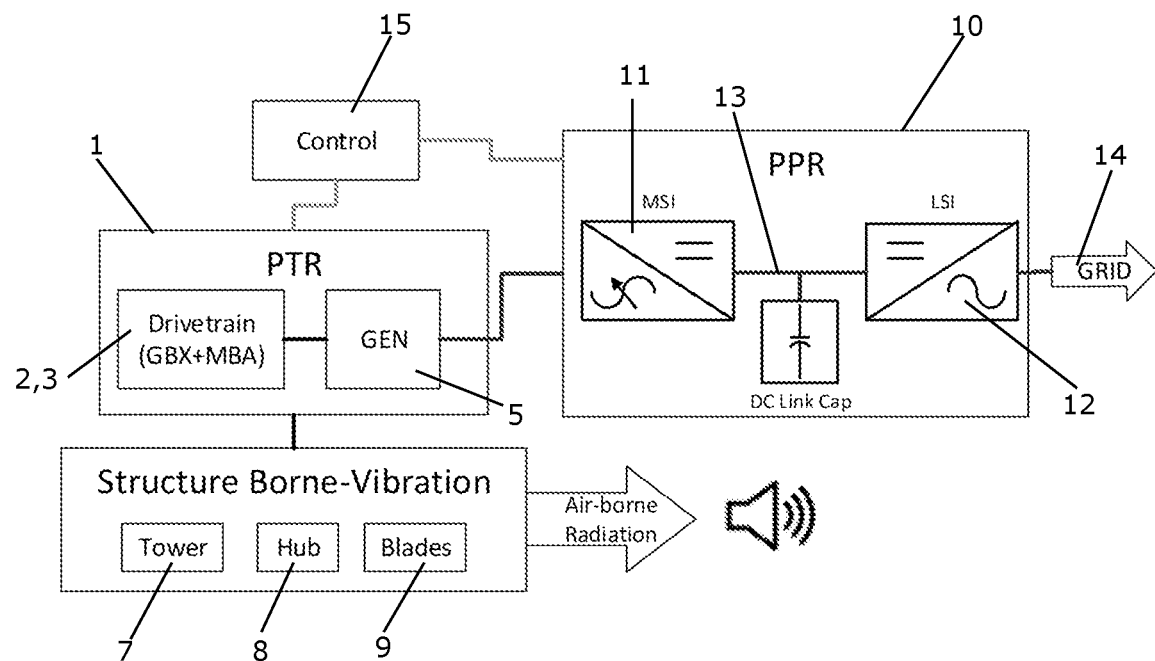
FIGS. 2 and 3 are diagrams illustrating a wind turbine being controlled in accordance with a method according to an embodiment of the invention.

FIG. 2 is a diagrammatic view of a power generating part of a wind turbine being controlled in accordance with a method according to an embodiment of the invention. FIG. 2 illustrates a power train 1 of the wind turbine, including a drivetrain with a main shaft 2 and a gearbox 3, and a generator 5. The power train 1 is mechanically connected to large structures of the wind turbine, in the form of tower 7, hub 8 and wind turbine blades 9. These large structures amplify vibrations of the power train 1, and thereby emit air-borne noise to the surroundings.

The generator 5 is further connected to an electrical power production system 10, comprising a turbine side AC/DC converter 11 and a grid side DC/AC converter 12, being interconnected by a DC link 13. The AC output of the grid side converter 12 is connected to a power grid 14.

The power train 1 and the electrical power production system 10 are controlled by means of a generator controller 15. Vibrations originating from gear tooth meshing of the gearbox 3 are measured and based thereon a torque modulating signal for the generator 5 is generated, by the generator controller 15, e.g., in the manner described above with reference to FIG. 1. The generator controller 15 then controls the electrical power production system 10 in accordance with the torque modulating signal, thereby controlling the torque of the generator 5 in such a manner that the amplitude of the resultant vibration of the power train 1 is minimised. Thereby the air-borne noise emitted by the tower 7, the hub 8 and the wind turbine blades 9 is also minimised.

Figure 3:
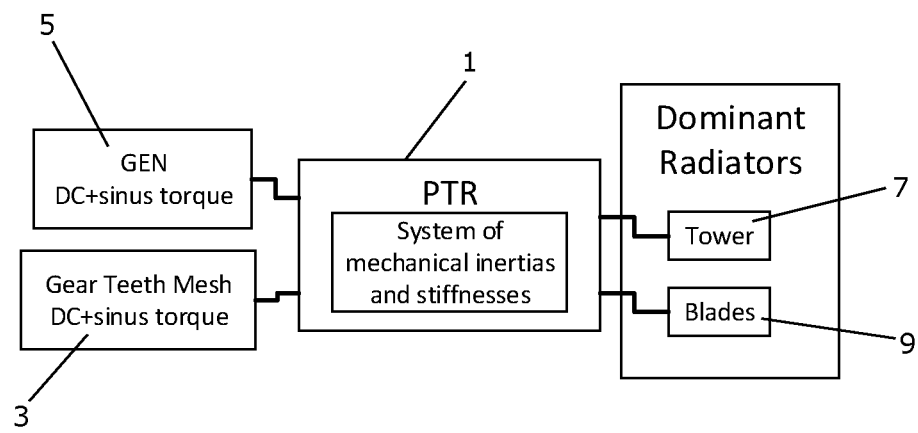

FIG. 3 is a diagrammatic view of parts of a wind turbine being controlled in accordance with a method according to an embodiment of the invention, similar to the wind turbine illustrated in FIG. 2. FIG. 3 illustrates the power train 1, the gearbox 3, the generator 5, the tower 7 and the wind turbine blades 9. More particularly, FIG. 3 illustrates that the generator 5 is operated in such a manner that the vibrations originating from gear tooth meshing of the gearbox 3 and the vibrations originating from the generator 5 to the greatest possible extent cancel out, resulting in a minimisation of the air-borne noise emitted by the tower 7 and the wind turbine blades 9.

Figure 4:
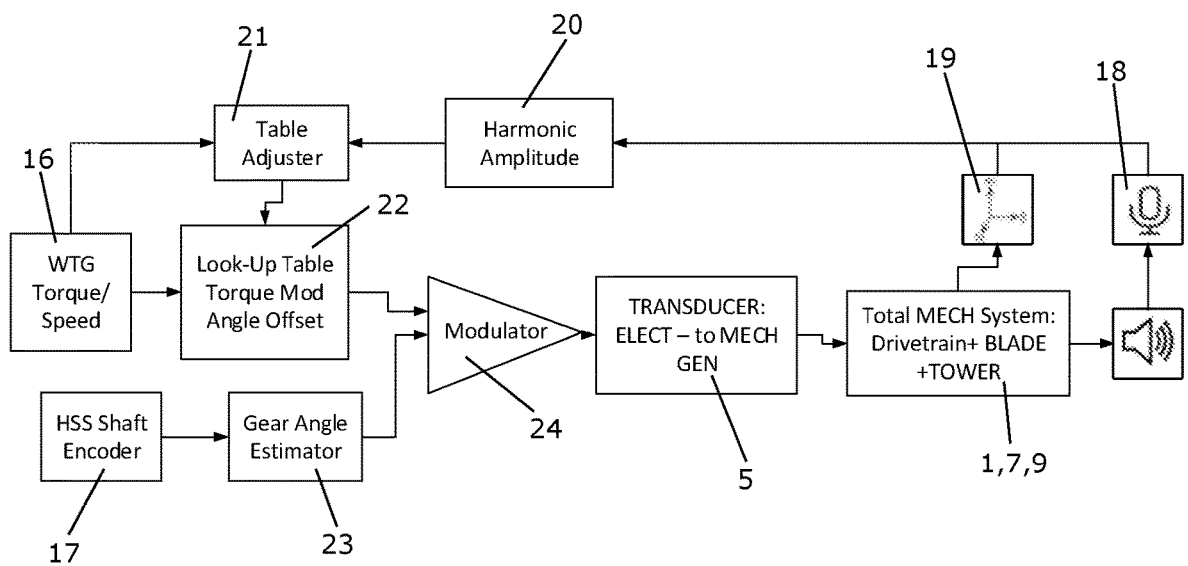
FIG. 4 is a block diagram illustrating a method according to an embodiment of the invention.

FIG. 4 is a block diagram illustrating a method according to an embodiment of the invention.

A measure for a rotational speed of the generator 5 is obtained by means of a torque/speed sensor 16 and a high-speed shaft encoder 17. Furthermore, a measure for vibrations originating from gear tooth meshing of the gearbox 3 is obtained by means of a noise sensor 18 and a vibration sensor 19 mounted on the drivetrain. An amplitude 20 of a harmonic in the gearbox vibrations is determined and supplied to a table adjuster 21 which updates a look-up table 22 based thereon.

Based on the output from the torque/speed sensor 16 and the high-speed shaft encoder 17, a phase angle and an amplitude are selected, using the look-up table 22 and a gear angle estimator 23. The phase angle and the amplitude are supplied to a modulator 24, which generates a torque modulating signal which specifies the selected phase angle and the selected amplitude, and the torque modulating signal is injected into the generator 5. Accordingly, the generator 5 is operated in accordance with the torque modulating signal, and thereby in accordance with the specified phase angle and amplitude. This causes the generator 5 to operate in a manner which matches the operation of the gearbox 3 in the sense that vibrations originating from gear tooth meshing of the gearbox 3 and vibrations originating from the generator 5 cancel out to the greatest possible extent, thereby minimising an amplitude of a resultant vibration of the power train.

The phase angle and the amplitude of the torque modulating signal may be continuously adjusted, based on measurements of the noise sensor 18 and/or the vibration sensor 19, until a minimum in amplitude of the resultant vibration is obtained, e.g., in the manner described above with reference to FIG. 1.

Figure 5:
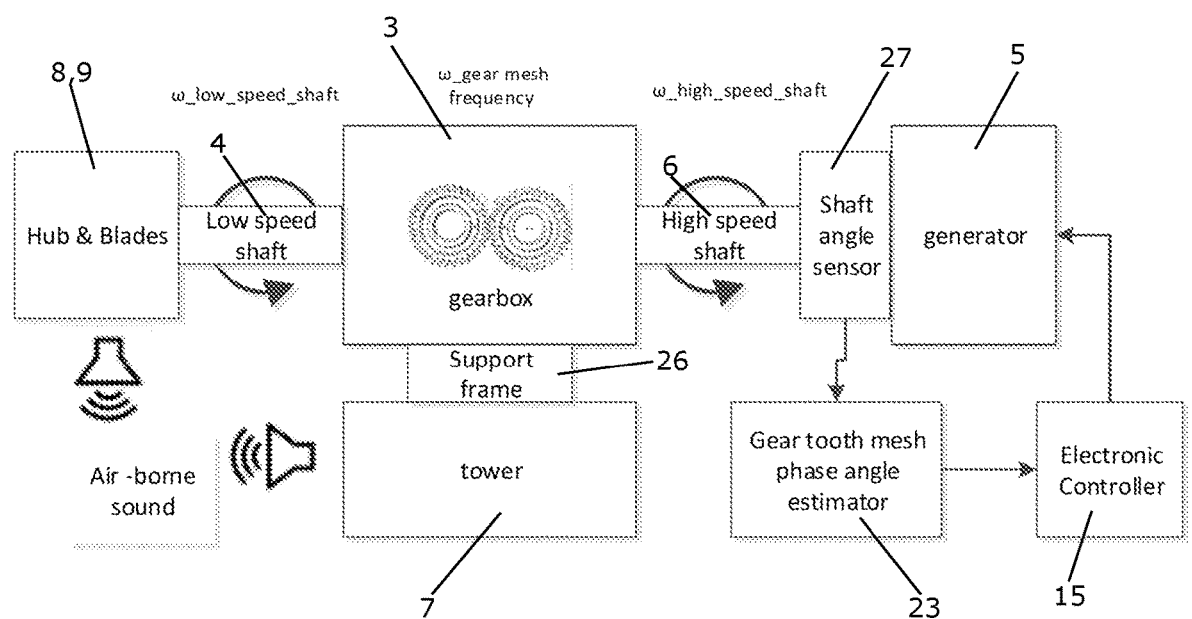
FIG. 5 illustrates a power generating part of a wind turbine being controlled in accordance with a method according to a further embodiment of the invention.

FIG. 5 illustrates a power generating part of a wind turbine being controlled in accordance with a method according to a further embodiment of the invention. FIG. 5 shows a gearbox 3 connected to a hub 8 and wind turbine blades 9 via a low-speed input shaft 4 and to a generator 5 via a high-speed output shaft 6. The gearbox 3 is further structurally connected to a tower 7 via a support frame 26. The wind turbine blades 9 and the tower 7 amplify vibrations of the gearbox 3, thereby creating airborne noise, as described above.

The wind turbine illustrated in FIG. 5 is controlled essentially as described above with reference to FIGS. 1-4, in order to minimise the noise emitted by the tower and the wind turbine blades 9 and originating from gear tooth meshing. The remarks set forth in this regard are therefore equally applicable here.

A shaft angle sensor 27 measures a shaft angle of the high-speed shaft 6, thereby keeping track of the phase angle of the high-speed shaft 6 over time.

The output of the shaft angle sensor 27 is supplied to a gear angle estimator 23. Based thereon, the gear angle estimator 23 estimates a phase angle and supplies this to a generator controller 15. The generator controller 15 generates a torque modulation signal for the generator 5, which specifies the estimated phase angle. The gear angle estimator 23 repeatedly adjusts the estimated phase angle, based on input from the shaft angle sensor 27, and in order to minimise a phase angle offset between the phase angle of the high-speed shaft 6 and the phase angle of the gear tooth meshing of the gearbox 3, thereby minimising the resultant vibration.

The ratios between the low-speed shaft 4, the high-speed shaft 6 and the frequency of the gear tooth meshing are fixed and determined by the mechanical design of the gearbox 3. However, the ratio between the high-speed shaft 6 and the gear tooth meshing is non-integer. Therefore, the gear angle estimator 23 needs to synthesize an angle which will require several complete revolutions of the high-speed shaft 6 before the gear tooth pattern repeats itself, and which stays aligned with observable shaft angles of the gearbox 3.

This is obtained by means of a phase-locked loop, which periodically realigns the shaft angle of the output shaft 6 and the phase angle of the gear tooth meshing, in order to prevent drifting out of synchronism. According to the invention, this is done without knowledge or measurement of the phase angle of the gear tooth meshing, but purely by observing the resultant vibration.

Instead, the shaft angle sensor 27 keeps track of where the phase angle of the high-speed shaft 6 starts, and the gear angle estimator 23 and the generator controller 15 generate a torque modulating signal which is synchronized with the phase angle of the gear tooth meshing. The phase angle offset is unknown, but by adjusting the internal offset until the observable resultant vibration has reached a minimum, synchronization is obtained.

Figure 6:
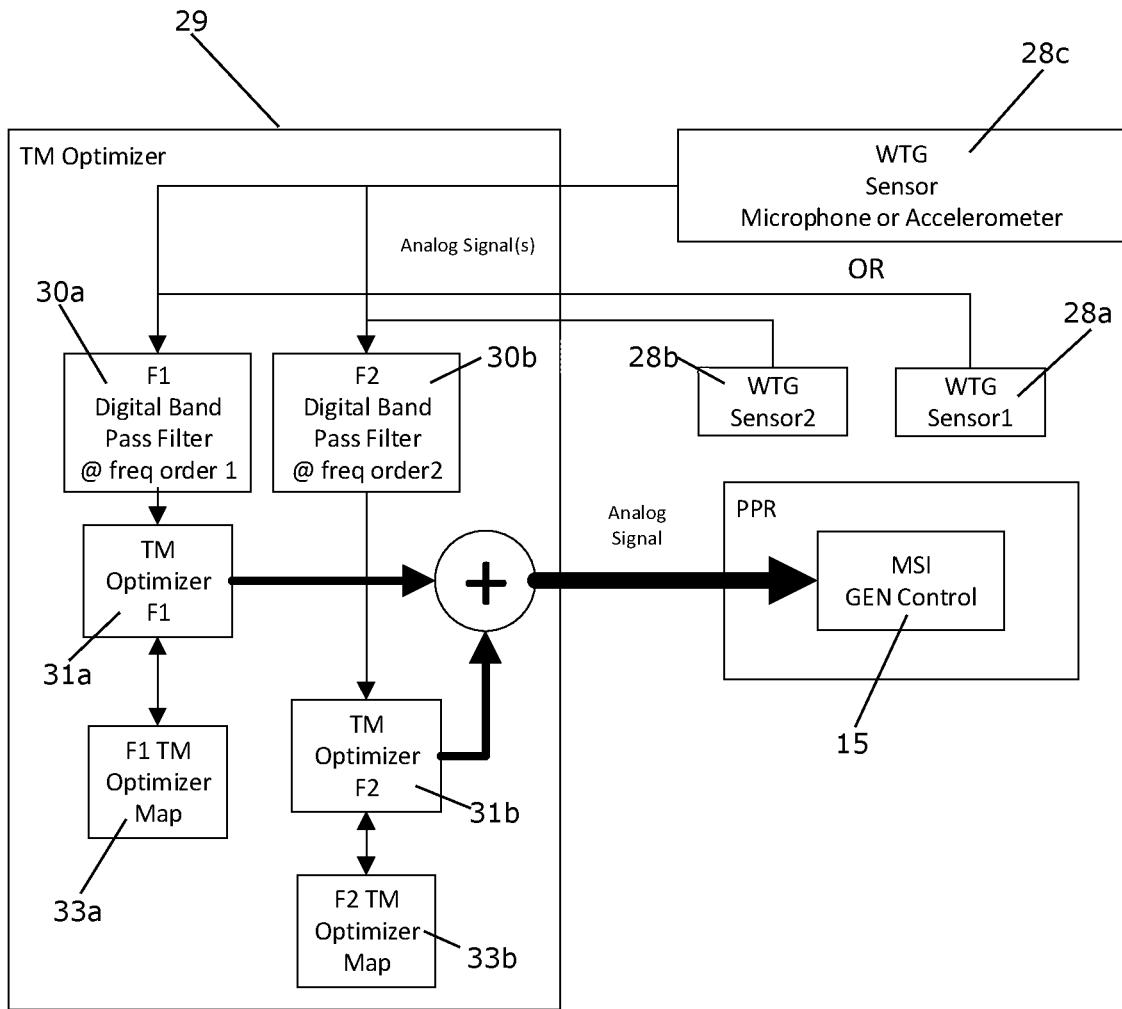
FIGS. 6 and 7 are block diagrams illustrating a method according to two embodiments of the invention.

FIG. 6 is a block diagram illustrating a method according to an embodiment of the invention. Vibrations of a wind turbine, e.g., in the form of resultant vibrations of vibrations of the gearbox and vibrations of the generator, are measured by means of suitable sensors 28, and the measured signals are supplied to a torque modulation optimizer module 29. More particularly, the measured signals are supplied to a first digital band pass filter 30a and to a second digital band pass filter 30b. The digital band pass filters 30a, 30b are designed to allow two different frequency bands to pass, corresponding to two different harmonics in the gearbox vibrations.

The first digital band pass filter 30a may receive measurements only from a first sensor 28a, or set of sensors 28a, while the second digital band pass filter 30b receives measurements only from a second sensor 28b or set of sensors 28b. In this case handling of the two harmonics is completely separated in two distinct and parallel channels. As an alternative, both digital band pass filters 30a, 30b may receive measurements from the same sensor 28c, or set of sensors 28c.

The band pass filtered signals are supplied to respective torque modulation optimizers 31a, 31b, where respective torque modulating signals, specifying respective phase angles and amplitudes, are generated in the manner described above, i.e., in such a manner that an amplitude of a resultant vibration of vibrations of the gearbox and vibrations of the generator, corresponding to the respective harmonics, is minimised.

The two torque modulating signals are added to each other at adder 32, thereby obtaining a resultant torque modulating signal, which is supplied to a generator controller 15 for injection into the generator. Furthermore, respective torque modulation optimizer maps 33a, 33b are generated.

Thus, in the embodiment illustrated in FIG. 6, two harmonics are handled simultaneously, and via two separate channels, represented by the separate digital band pass filters 30a, 30b and torque modulation optimizers 31a, 31b, and the resultant torque modulating signal ensures minimised resultant vibrations corresponding to both harmonics. It should be noted that the concept illustrated in FIG. 6 could be expanded to include further channels, representing further harmonics in the gearbox vibrations, thereby allowing for simultaneous handling of three or more harmonics in the gearbox vibrations.

Figure 7:
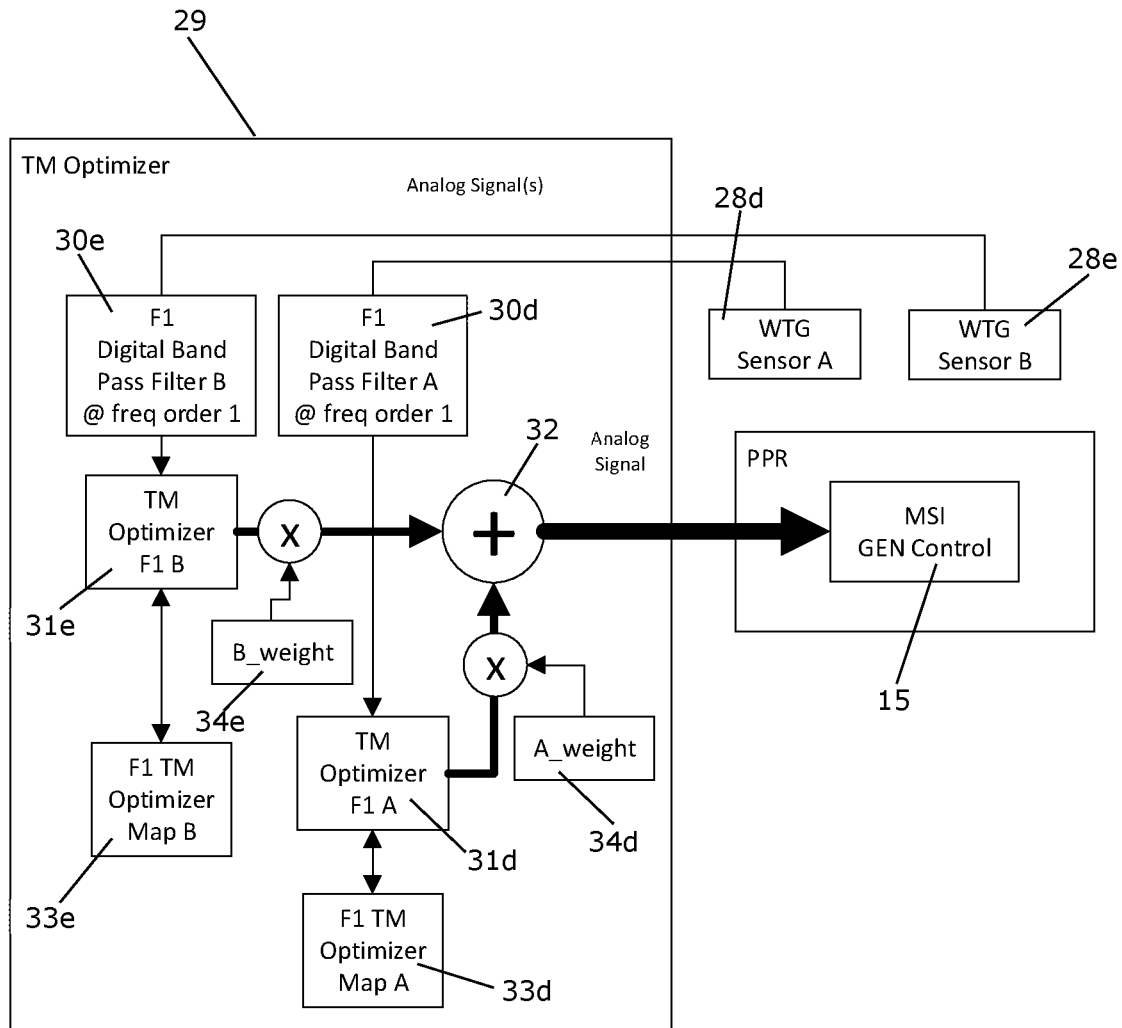

FIG. 7 is a block diagram illustrating a method according to an alternative embodiment of the invention. Similarly, to the embodiment illustrated in FIG. 6, vibrations of a wind turbine are measured by means of appropriate sensors 28d, 28e, and the measured signals are supplied to a torque modulation optimizer module 29.

More particularly, measured signals from sensor 28d are supplied to digital band pass filter 30d, while measured signals from sensor 28e are supplied to digital band pass filter 30e. Contrary to the embodiment illustrated in FIG. 6, the digital band pass filters 30d, 30e illustrated in FIG. 7 are designed to allow the same frequency band to pass, i.e., the band pass filters 30d, 30e handle the same harmonic, but based on measurements from different sensors 28d, 28e.

Similarly, to the embodiment illustrated in FIG. 6, the band pass filtered signals are supplied to respective torque modulation optimizers 31d, 31e, where respective torque modulating signals, specifying respective phase angles and amplitudes, are generated, in the manner described above. The torque modulating signals are multiplied by a suitable weighting factor 34d, 34e before they are added to each other at adder 32 in order to obtain a resultant torque modulating signal to be supplied to the generator controller 15, as described above.

The weighting factors 34d, 34e may be selected in such a manner that they reflect importance, significance, reliability, etc., of the respective corresponding sensors 28d, 28e.

Thus, in the embodiment illustrated in FIG. 7, one harmonic is handled via two separate and parallel channels, each channel relying on measurements from a separate sensor 28d, 28e.

FIG. 8 is a table illustrating optimum values for phase angle and amplitude for a torque modulating signal at various operating points of a wind turbine. More particularly, the table of FIG. 8 lists combinations of wind turbine torque, $T_i$, and rotational speed of the generator, $\omega_i$, each combination representing an operating point of the wind turbine. For each operating point, an optimal torque modulating signal is listed, represented by an optimal amplitude, $Tm_{ij}$, and an optimal phase angle, $\theta_{ij}$. The amplitudes, $Tm_{ij}$, and phase angles, $\theta_{ij}$, have been identified in an optimisation process according to the invention, and as described above. Accordingly, they represent a torque modulating signal which will result in minimisation of a resultant vibration of vibrations of the gearbox and vibrations of the generator, when injected into the generator.

The table of FIG. 8 may be applied as a look-up table for selecting an appropriate torque modulating signal during operation of the wind turbine. The table of FIG. 8 can also be seen as an example of the look-up table, provided to a newly installed wind turbine, where a model specific look-up table is used as an initial table. The turbine specific table will then evolve over time as the table get tuned and the turbine components are exposed to wear.

The invention claimed is:

1. A method for controlling operation of a generator for a wind turbine, the method comprising:
    obtaining a measure for a rotational speed of the generator,
    obtaining a measure for a shaft angle of the generator,
    obtaining a measure for gearbox vibrations originating from gear tooth meshing of a gearbox of the wind turbine, at the rotational speed of the generator,
    determining at least one amplitude of a harmonic in the gearbox vibrations,
    generating a torque modulating signal for the generator by:
        selecting a gear tooth phase angle and an amplitude, based on the rotational speed of the generator, on initial characteristics of the wind turbine, and on the at least one amplitude of the harmonic in the gearbox vibrations,
    deriving a gear tooth angle estimator from the shaft angle of the generator and the gear tooth phase angle multiplied by a gearbox ratio of a gearbox stage of the harmonic in the gearbox vibrations,
    generating an initial torque modulating signal for the generator specifying the gear tooth phase angle and the amplitude,
    injecting the initial torque modulating signal into the generator and operating the generator based on the initial torque modulating signal, while monitoring a resultant vibration of vibrations originating from the gearbox and vibrations originating from the generator, corresponding to the harmonic in the gearbox vibrations,
    adjusting the gear tooth phase angle of the torque modulating signal with respect to the gear tooth angle estimator and the amplitude of the torque modulating signal to fit with an actual position of the gearbox as well as with an actual position of the generator, based on the monitored resultant vibration, until a minimum in amplitude of the resultant vibration is reached, thereby obtaining an adjusted torque modulating signal, and
    injecting the adjusted torque modulating signal into the generator, resulting in the resultant vibration of vibrations of the gearbox and vibrations of the generator, corresponding to the harmonic in the gearbox vibrations, being reduced.

2. The method according to claim 1, wherein the amplitude of the torque modulating signal is adjusted, based on the monitored resultant vibration, until the minimum in amplitude of the resultant vibration is reached, to obtain the adjusted torque modulating signal subsequent to the gear tooth phase angle of the torque modulating signal being adjusted to fit with the actual position of the gearbox as well as with the actual position of the generator, based on the monitored resultant vibration, until the minimum in amplitude of the resultant vibration is reached.

3. The method according to claim 1, wherein selecting the gear tooth phase angle and the amplitude comprises selecting at least an amplitude from a look-up table.

4. The method according to claim 3, further comprising updating the look-up table, based on the adjusted gear tooth phase angle and/or the adjusted amplitude of the adjusted torque modulating signal.

5. The method according to claim 1, wherein obtaining the measure for vibrations originating from gear tooth meshing of the gearbox comprises deriving a frequency of the harmonic in the gearbox vibrations, based on the rotational speed of the generator.

6. The method according to claim 5, wherein the initial torque modulating signal further specifies the frequency of the harmonic in the gearbox vibrations.

7. The method according to claim 1, wherein obtaining the measure for vibrations originating from gear tooth meshing of the gearbox comprises measuring vibrations of the gearbox.

8. The method according to claim 1, wherein injecting the torque modulating signal into the generator comprises injecting the torque modulating signal into an electronic generator controller.

9. The method according to claim 1, further comprising continuously adjusting the gear tooth phase angle and the amplitude of the torque modulating signal in order to maintain the amplitude of the resultant vibration at the minimum.

10. The method according to claim 1, wherein selecting the gear tooth phase angle is further based on the shaft angle of the generator.

11. The method according to claim 1, further comprising:
determining at least one amplitude of at least one further harmonic in the gearbox vibrations,
deriving a further gear tooth angle estimator from the shaft angle of the generator and the selected gear tooth phase angle multiplied by a gearbox ratio of a gearbox stage of the at least one further harmonic in the gearbox vibrations, and
selecting a further initial gear tooth phase angle and an amplitude, based on the rotational speed of the generator, on characteristics of the wind turbine, and on the at least one amplitude of the at least one further harmonic in the gearbox vibrations, and
generating a further torque modulating signal for the generator specifying the selected gear tooth phase angle of the further torque modulated signal and the selected amplitude of the at least one further harmonic in the gearbox vibrations,
adjusting the gear tooth phase angle of the further torque modulating signal with respect to the further gear tooth angle estimator and the amplitude of the further torque modulating signal to fit with an actual position of the gearbox as well as with an actual position of the generator, based on the monitored resultant vibration, until a minimum in amplitude of the resultant vibration is reached, thereby obtaining an adjusted further torque modulating signal,
wherein the step of injecting the adjusted torque modulating signal into the generator comprises adding the adjusted torque modulating signal and the adjusted further torque modulating signal(s), thereby obtaining a resultant torque modulating signal, and injecting the resultant torque modulating signal into the generator.

12. The method according to claim 11, wherein
a torque modulating signal is generated for each of the at least one further harmonic such that the resultant vibration corresponding to the respective harmonic is minimized, and wherein the torque modulating signals generated for each of the at least one further harmonic are added to obtain the resultant torque modulating signal that is injected into the generator.

13. The method according to claim 11, wherein obtaining the measure for vibrations originating from gear tooth meshing of the gearbox comprises obtaining measurements from at least two sensors, and wherein each sensor provides measurements related to a separate harmonic in the gearbox vibrations.

14. The method according to claim 1, further comprising communicating the gear tooth phase angle and the amplitude of the adjusted torque modulating signal to a monitoring system.

15. A method for controlling operation of a generator for a wind turbine, the method comprising:
obtaining a measure for a rotational speed of the generator,
obtaining a measure for a shaft angle of the generator,
obtaining a measure for gearbox vibrations originating from gear tooth meshing of a gearbox of the wind turbine, at the rotational speed of the generator,
determining at least one amplitude of a harmonic in the gearbox vibrations,
selecting a gear tooth phase angle and an amplitude, based on the rotational speed of the generator, on initial characteristics of the wind turbine, and on the at least one amplitude of the harmonic in the gearbox vibrations,
deriving a gear tooth angle estimator from the shaft angle of the generator and the gear tooth phase angle multiplied by a gearbox ratio of a gearbox stage of the harmonic in the gearbox vibrations,
generating a torque modulating signal for the generator specifying the gear tooth phase angle and the amplitude, and
injecting the torque modulating signal into the generator, resulting in a resultant vibration of vibrations of the gearbox and vibrations of the generator, corresponding to the harmonic in the gearbox vibrations, being reduced.

16. A method for controlling operation of a generator for a wind turbine, the method comprising:
obtaining a measure for gearbox vibrations originating from a gear tooth meshing of a gearbox of the wind turbine, at a rotational speed of the generator;
determining at least one amplitude of a harmonic in the gearbox vibrations;
generating a torque modulating signal for the generator by:
selecting a gear tooth phase angle and an amplitude, based on the rotational speed of the generator, on initial characteristics of the wind turbine, and on the at least one amplitude of the harmonic in the gearbox vibrations;
deriving a gear tooth angle estimator from a generator shaft angle position and the gear tooth phase angle multiplied by a gearbox ratio of a gearbox stage of the harmonic in the gearbox vibrations;
generating an initial torque modulating signal for the generator specifying the gear tooth phase angle and the amplitude;
injecting the initial torque modulating signal into the generator and operating the generator based on the initial torque modulating signal, while monitoring vibrations originating from the gearbox and vibrations originating from the generator, corresponding to the harmonic in the gearbox vibrations; and
adjusting the gear tooth phase angle of the torque modulating signal with respect to the gear tooth angle estimator and the amplitude of the torque modulating signal to fit with an actual position of the gearbox as well as with an actual position of the generator, based on a monitored resultant vibration, until a minimum in amplitude of the resultant vibration is reached, thereby obtaining an adjusted torque modulating signal; and
injecting the adjusted torque modulating signal into the generator.

17. The method according to claim 16, wherein the amplitude of the torque modulating signal is adjusted, based on the monitored resultant vibration, until the minimum in amplitude of the resultant vibration is reached, to obtain the adjusted torque modulating signal subsequent to the gear tooth phase angle of the torque modulating signal being adjusted to fit with the actual position of the gearbox as well as with the actual position of the generator, based on the monitored resultant vibration, until the minimum in amplitude of the resultant vibration is reached.

18. The method according to claim 16, wherein selecting the gear tooth phase angle and the amplitude comprises selecting at least an amplitude from a look-up table.

19. The method according to claim 16, wherein obtaining the measure for vibrations originating from gear tooth meshing of the gearbox comprises deriving a frequency of the harmonic in the gearbox vibrations, based on the rotational speed of the generator.

20. The method according to claim 16, wherein injecting the torque modulating signal into the generator comprises injecting the torque modulating signal into an electronic generator controller.

\* \* \* \* \*